(12) United States Patent
Haq

(10) Patent No.: US 11,367,915 B2
(45) Date of Patent: Jun. 21, 2022

(54) FLOW BATTERY, PROCESS FOR THE MANUFACTURE, AND USE THEREOF

(71) Applicant: HILABS GMBH, Stuttgart (DE)

(72) Inventor: Manan Haq, Stuttgart (DE)

(73) Assignee: HILABS INC., Stuttgart (DE)

( * ) Notice: Subject to any disclaimer, the term of this patent is extended or adjusted under 35 U.S.C. 154(b) by 15 days.

(21) Appl. No.: 16/969,117

(22) PCT Filed: Feb. 12, 2018

(86) PCT No.: PCT/EP2018/053371
§ 371 (c)(1),
(2) Date: Aug. 11, 2020

(87) PCT Pub. No.: WO2019/154516
PCT Pub. Date: Aug. 15, 2019

(65) Prior Publication Data
US 2021/0043880 A1    Feb. 11, 2021

(51) Int. Cl.
*H01M 4/88* (2006.01)
*H01M 50/138* (2021.01)
(Continued)

(52) U.S. Cl.
CPC ..... *H01M 50/1385* (2021.01); *H01M 4/8807* (2013.01); *H01M 4/8828* (2013.01); *H01M 4/8875* (2013.01); *H01M 12/065* (2013.01); *H01M 12/08* (2013.01); *H01M 2220/20* (2013.01)

(58) Field of Classification Search
CPC ........... H01M 50/1385; H01M 4/8807; H01M 4/8828; H01M 4/8875; H01M 12/065
See application file for complete search history.

(56) References Cited

U.S. PATENT DOCUMENTS 4,714,662 A    12/1987  Bennett et al.
5,049,457 A *   9/1991  Niksa .................... H01M 10/52
                                                     429/405
(Continued)

FOREIGN PATENT DOCUMENTS

EP          3321990 A1    5/2018
WO       2014051458 A1    4/2014
WO       2015009029 A1    1/2015

OTHER PUBLICATIONS

Dunlap, Richard A., "Sustainable Energy. Stamford": Cengage Learning, 2015. ISBN 1133108776. p. 495.
(Continued)

*Primary Examiner* — Olatunji A Godo
(74) *Attorney, Agent, or Firm* — Browdy and Neimark, PLLC

(57) ABSTRACT

State-of-the-art flow batteries suffer from drawbacks such as congestion of their electrodes, defects in liquid tightness, or shunt currents, all of which may lead to efficiency drop. Solution The problem is solved by a flow battery comprising multi-chambered ducts (100) mutually plugged together, each duct containing an integrated air electrode (111) and partition walls being partly ion-permeably perforated and partly impermeable, and nonconducting joining elements with integrated passages, the joining elements plugged bilaterally onto the ducts (100).

19 Claims, 4 Drawing Sheets

(51) Int. Cl.
H01M 12/06 (2006.01)
H01M 12/08 (2006.01)

(56) References Cited

U.S. PATENT DOCUMENTS

| | | |
|---|---|---|
| 5,445,901 A | 8/1995 | Korall et al. |
| 2011/0171563 A1* | 7/2011 | Waki .................. H01M 8/0245 |
| | | 429/514 |
| 2014/0255812 A1 | 9/2014 | Fischel |

OTHER PUBLICATIONS

Noack, Jens, et al. "The Chemistry of Redox-Flow Batteries"., Angew. Chem., Int. Ed. Engl.. Jun. 26, 2015, vol. 54, No. 34, p. 9776-9809.

* cited by examiner

FLOW BATTERY, PROCESS FOR THE MANUFACTURE, AND USE THEREOF

TECHNICAL FIELD

The invention pertains to a flow battery, particularly a metal-air flow battery.

BACKGROUND ART

In electrochemistry and electrochemical engineering, by flow battery or redox flow battery (after reduction-oxidation) is meant a kind of battery where rechargeability is provided by two chemical components dissolved in liquids contained within the system and separated by a membrane. Because flow batteries can be rapidly "recharged" by replacing the electrolyte, they are increasingly considered for application in battery electric vehicles (BEV), as is pointed out in DUNLAP, Richard A. Sustainable Energy. Stamford: Cengage Learning, 2015. ISBN 1133108776. p. 495. An overview and classification of this battery type is presented in NOACK, Jens, et al. The Chemistry of Redox-Flow Batteries. *Angew. Chem., Int. Ed. Engl..* 26 Jun. 2015, vol. 54, no. 34, p. 9776-9809.

U.S. Pat. No. 5,445,901 A (KORALL MENACHEM [IL] ET AL) 29.08.1995 discloses a multi-cell, sealed, zinc-oxygen battery, comprising a container containing (a) a plurality of bi-cells, each cell having a housing provided with two major surfaces and accommodating a pair of oppositely-disposed, spaced-apart, air-permeable, liquid-impermeable cathodes in the form of oxygen-reduction electrodes, and defining between themselves a cavity configured to accommodate an anode of the battery and electrolyte, substantial portions of the major surfaces of the housing being removed, thus exposing major portions of the oxygen electrodes, and wherein the two major surfaces are partly recessed in such a way as to form, in conjunction with a similarly-recessed outer surface of a major wall of an adjacent cell housing, an inter-cathode gas space between adjacent cells with a plurality of oxygen access openings leading thereto; (b) a dead space volume between inner surfaces of the housing and the plurality of bi-cells; and (c) pressurized oxygen supply means for feeding oxygen to the dead space volume, for consumption in the inter-cathode gas spaces.

Taylor Vortex Flow galvanic electrochemical cells such as batteries, flow cells and fuel cells for converting chemical energy into electrical energy and comprising a cylindrical spinning particulate filter between static cylindrical current collectors for use with electrolytes containing galvanic charge transfer particles functioning as numerous miniature electrodes and means for pumping electrolyte through the filter to produce accelerated reaction electrochemistry for higher cell power density are disclosed in US 2014255812 A (FISCH EL HALBERT [US]) 11.09.2014.

U.S. Pat. No. 4,714,662 A (BENNETT WILLIAM R [US]) 22.12.1987 discloses a power module of the type including a plurality of power cells arranged in a longitudinal stacked relation. Each power cell includes a frame, a gas-consuming cathode supported at one end of the frame and a consumable anode supported intermediate the ends of the frame by a flexible diaphragm spanning the frame. The diaphragm divides the frame into a chamber for the introduction thereinto of an electrolyte between the anode and the cathode, and an expansion chamber on the opposite side of the anode for the introduction thereinto of fluid under pressure. The pressurized fluid biases the anode toward the cathode during anode consumption, and the diaphragm provides for longitudinal and angular movement of the anode to accommodate uneven corrosion of the anode. The frames of adjacent cells define a third chamber therebetween for the introduction of consumable gas to the cathode. An array of manifolds is formed throughout the frames of adjacent power cells for introducing electrolyte between the anode and the cathode, for introducing consumable gas to the cathode and for introducing fluid under pressure to the expansion chamber.

WO 2015009029 A (H2 INC [KR]) 22.01.2015 relates to a redox flow battery or fuel cell stack assembled by stacking a plurality of plates provided with a passage through which an electrolyte passes, the redox flow battery or fuel cell stack comprising a plurality of electrolyte tubes inserted in the electrolyte passages, ion exchange membranes, and flow frames disposed at either side of the ion exchange membranes, wherein each flow frame has an electrolyte flow path formed therein and one end of each of the plurality of electrolyte tubes comes in contact with each of the electrolyte flow paths.

SUMMARY OF INVENTION

The invention aims to provide an improved flow battery.

Technical Problem

State-of-the-art flow batteries suffer from drawbacks such as congestion of their electrodes, defects in liquid tightness, or shunt currents, all of which may lead to efficiency drop.

Solution to Problem

The problem is solved by the characterizing features of the independent claims.

Advantageous Effect of Invention

The modular approach as per the invention allows for a dramatic increase in energy density, shortening of charge time, and cost-efficient production. Embodiments of the invention are set out in the dependent claims.

Particularly, a reduction of sealing surfaces may be achieved to avoid leakage. Such leakage poses a major problem with known flow batteries, where components such as air electrode, separator, bipolar plate, and circuitry need to be stacked and mutually sealed. In these conventional batteries, the use of different materials of varying porosity and surface texture typically impedes the implementation of a seal that is free from leakage. Additionally, the separator film used in these devices tends to roll away, further complicating the stacking procedure.

Another embodiment provides for the introduction of energizing elements into the channel structure to enhance fluid flow by avoiding dead water areas, calculus generation, or clogging, increase turbulence and ionic conductivity, and improve clustering as well as hydrogen bonding. These improvements in turn lead to an increased self-cleaning capacity of the air electrode, ultimately resulting in an extended service life of the resulting battery.

Said energizing elements may possess various characteristics and consist of materials such as synthetics, ferromagnetic and other metals, crystals, and further constituents selected to affect clustering in water. Preferably, such elements are of a streamlined, flat shape that offers light flow resistance while introducing turbulence into the fluid flow, thus promoting mixing. This way, metal particles carried axially in the fluid without prior conductor contact may be pressed against the channel wall where they can undergo the desired reaction.

Advantageously, the structural, conceptional, material, and procedural aspects of the invention render the proposed battery suited as a torsionally rigid tube for light-weight design. Here, its multi-chambered ducts may serve a dual purpose both as a structural and functional element. In this application, the inventive approach facilitates a massive increase in energy density compared to conventional flow batteries: In the latter case, the reactor, failing to contribute to the supporting structure, essentially constitutes dead mass when incorporated into a vehicle or other mobile apparatus. By contrast, an embodiment of the invention permits a highly scalable BEV design. When filled with ionic fluid, the battery may even achieve a cooling effect.

Furthermore, the uniform structure inherent to an embodiment of the invention allows for a significant reduction in manufacturing expenses by eliminating a large part of the production costs associated with conventional battery stacks. Firstly, its modular layout applies broadly to a variety of form factors and particularly provides for a series connection of arbitrary voltage. To this end, any number of ducts may be arranged in a planar structure such as the floor panel of a battery electric vehicle. Secondly, its manufacture does not require a dust-free clean room or otherwise controlled level of contamination, as is typically the case with conservative metal-air flow batteries. Thirdly, the proposed battery may be manufactured additively by means of so-called 3D printing. Fourthly and lastly, a worn-out battery as per the invention may be given a second life by remanufacturing or recycling any useable ducts in a factory environment.

DESCRIPTION OF EMBODIMENTS

One way of carrying out the invention claimed is hereinafter described at detail.

Example

Figure 1:
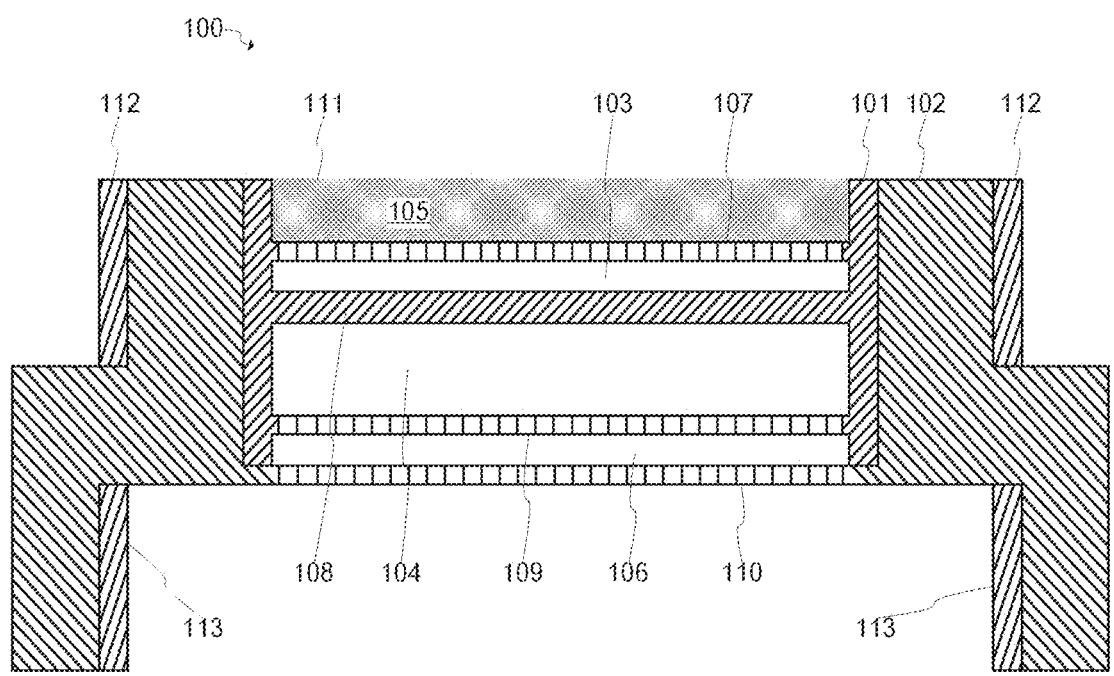
FIG. 1 is a transversal section of a battery duct.

FIG. 1 shows a multi-chambered duct (100) comprising an insulating and lye-proof outer frame (102) of polypropylene and a conducting inner frame (101) encased therein. The inner frame (101) forms a first chamber (105) containing an air electrode (111), the first chamber (105) separated by a first partition wall (107) from a second chamber (103) filled with aerial oxygen or ionic liquid (not depicted). An impermeable second partition wall (108) seals the second chamber (103) from a third chamber (104) charged with zinc slurry (not depicted), which chamber in turn is divided from a fourth chamber (106) by a third partition wall (109). The first wall (107) and third wall (109), both of which are partly perforated, exhibit pores ranging from 100 nm to 5 μm in diameter. Opposite the third partition wall (109), the outer frame (102) forms a perforated outer wall (110) that delimits the fourth chamber (106) and encloses the electrolyte (not depicted) flowing therethrough. Also, the outer frame (102) exhibits complementarily formed regions (112, 113) that may be used for plugging the duct together with further ducts (100) of the same or similar shape and size.

Figure 2:
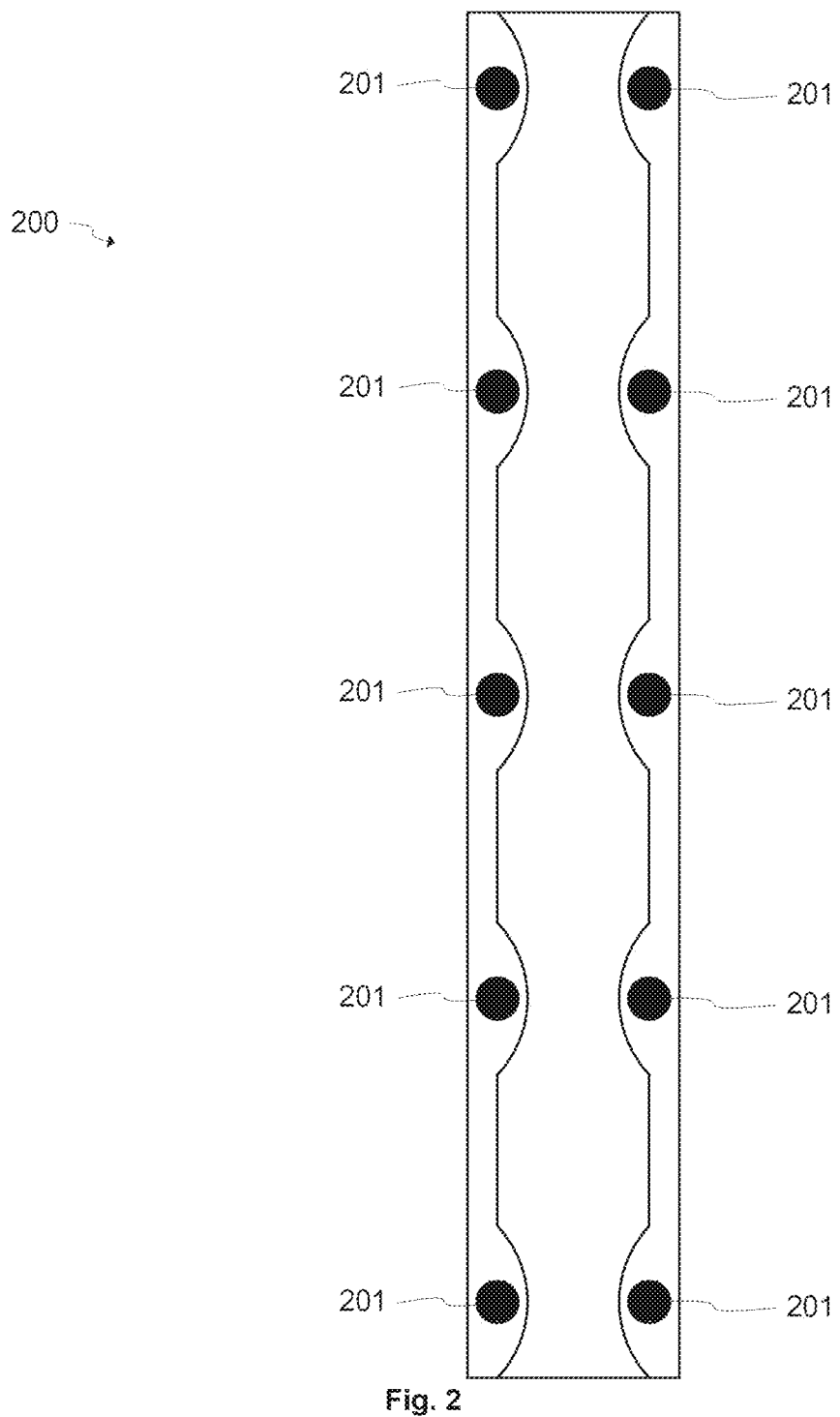
FIG. 2 is a longitudinal section of a chamber of the duct.
Figure 3:
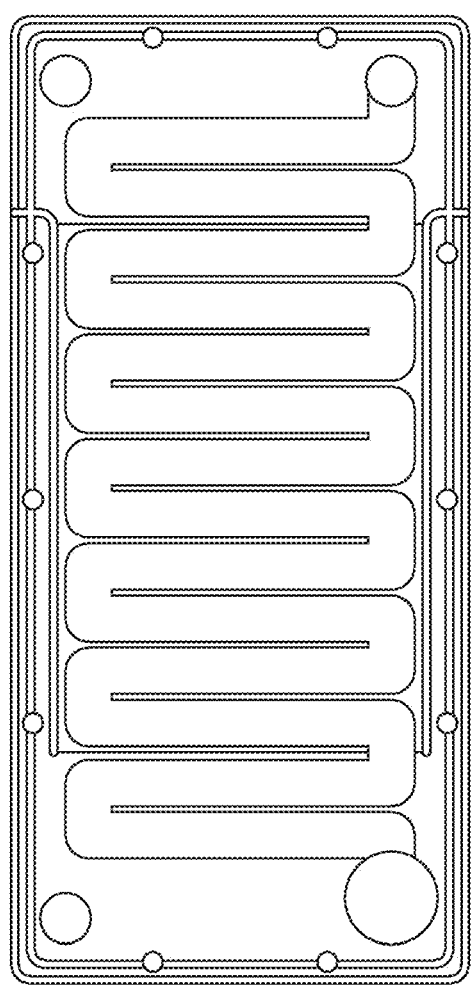
FIG. 3 is a plan view of the duct.

As may be taken from FIG. 2, the third or fourth chamber (200) comprises energizing elements (201) for guiding the fluid flow passing through it. Herein, each duct (300) exhibits an essentially uniform cross section such as the one shown in FIG. 3.

Figure 4:
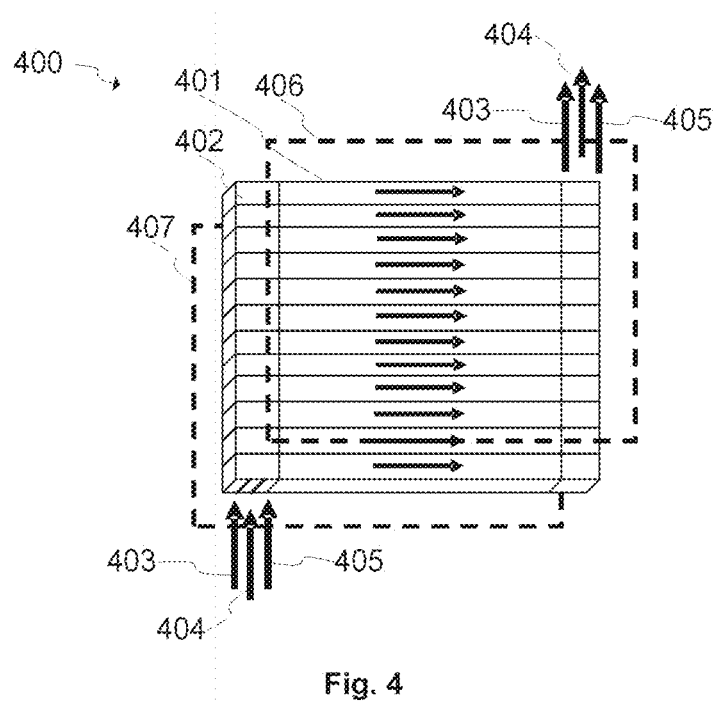
FIG. 4 is an exploded view of a battery.

An advantageous process for the manufacture of a flow battery (400) based on such ducts (100, 300, 401) is now described. To this end, a conductor may be extruded into stock that forms the chambers and walls therebetween, of which the first wall (107) and third wall (109) are laser-perforated. Next, a gas diffusion layer (GDL) and catalysis layer are wet-laid into the first chamber (105) and compressed with each other under a given pressure, these layers now jointly constituting the air electrode (111). Upon curing and pyrolyzing the latter, the stock is encased in a lye-proof insulator and broken down into ducts (100, 300, 401) such that the conductor forms the inner frame (101) and the insulator forms the outer frame (102) of each duct. The flow battery (400) may now be finalized by mutually plugging the ducts (100, 300, 401) together in a serial connection and plugging joining elements (402) bilaterally onto the ducts (100, 300, 401). The resulting panel can be welded between two thin shell elements (406, 407) for use as a support element in a car body. FIG. 4 shows an exploded view of a battery based on the ducts of the invention.

INDUSTRIAL APPLICABILITY

The invention is applicable throughout, inter alia, the electricity and manufacturing—especially automotive—industries.

REFERENCE SIGNS LIST

100 Duct
101 Inner frame
102 Outer frame
103 Second chamber
104 Third chamber
105 First chamber
106 Fourth chamber
107 First (partition) wall
108 Second (partition) wall
109 Third (partition) wall
110 Outer wall
111 Air electrode
112 Complementarily formed region
113 Complementarily formed region
200 Third or fourth chamber
201 Energizing element
300 Duct
400 Flow battery
401 Duct
402 Joining element
403 Air, ionic fluid, or electrolyte
404 Metal slurry
405 Ionic fluid or electrolyte
406 Shell element
407 Shell element

CITATION LIST

The following documents are cited throughout this document.

Patent Literature

U.S. Pat. No. 5,445,901 A (KORALL MENACHEM [IL] ET AL) 29.08.1995
US 2014255812 A (FISCH EL HALBERT [US]) 11.09.2014
U.S. Pat. No. 4,714,662 A (BENNETT WILLIAM R [US]) 22.12.1987
WO 2015009029 A (H2 INC [KR]) 22.01.2015

Non-Patent Literature

NOACK, Jens, et al. The Chemistry of Redox-Flow Batteries. *Angew. Chem., Int. Ed. Engl.* 26 Jun. 2015, vol. 54, no. 34, p. 9776-9809.
DUNLAP, Richard A. Sustainable Energy. Stamford: Cengage Learning, 2015. ISBN 1133108776. p. 495.

The invention claimed is:

1. A flow battery comprising multi-chambered ducts mutually plugged together, each duct containing an integrated air electrode, partition walls being partly ion-permeably perforated and partly impermeable, and nonconducting joining elements with integrated passages, the joining elements plugged bilaterally onto the ducts,
wherein each duct comprises an insulating and lye-proof outer frame, and a conducting inner frame encased in the outer frame,
wherein the inner frame defines a first chamber containing the air electrode, a second chamber adjacent to the first chamber, a third chamber adjacent to the second chamber, and a fourth chamber adjacent to the third chamber, and
wherein the inner frame comprises a partly perforated first partition wall between the first chamber and the second chamber, an impermeable second partition wall between the second chamber and the third chamber, and a partly perforated third partition wall between the third chamber and the fourth chamber.

2. The battery as in claim 1, wherein the insulating outer frame is lye-proof.

3. The battery as in claim 2, wherein the outer frame forms a perforated outer wall delimiting the fourth chamber opposite the third partition wall.

4. The battery as in claim 2, wherein the third chamber or fourth chamber comprises energizing elements for guiding or impairing a fluid flow.

5. The battery as in claim 2, wherein the second chamber contains oxygen, or ionic fluid.

6. The battery as in claim 2, wherein the third chamber contains metal slurry.

7. The battery as in claim 2, wherein the fourth chamber contains electrolyte.

8. The battery as in claim 2, wherein the first wall and third wall exhibit pores.

9. The battery as in claim 1, wherein each duct exhibits a longitudinally uniform cross section.

10. The battery as in claim 1, wherein the outer frame exhibits complementarily formed regions for plugging the ducts together.

11. A process for the manufacture of a battery as in claim 1 comprising extruding a conductor into stock such that the stock forms a first chamber for integrating an air electrode, a second chamber, a third chamber, a fourth chamber, a first partition wall between the first chamber and the second chamber, a second partition wall between the second chamber and the third chamber, and a third partition wall between the third chamber and the fourth chamber, perforating the first wall and third wall, integrating the air electrode into the first chamber, encasing the stock in a lye-proof insulator, breaking the stock down into ducts, mutually plugging the ducts together, and plugging joining elements bilaterally onto the ducts.

12. The process as in claim 11, wherein the first wall and third wall are laser-perforated.

13. The process as in claim 11, wherein the air electrode is integrated by wet-laying a gas diffusion layer into the first chamber, wet-laying a catalysis layer onto the gas diffusion layer, compressing the gas diffusion layer with the catalysis layer under a given pressure into the air electrode, curing the air electrode, and pyrolyzing the air electrode.

14. A method of manufacturing a structural element of an electric vehicle, the improvement comprising the battery of claim 1.

15. The method of claim 14, wherein the structural element is a floor panel of a car.

16. The battery of claim 2, wherein the insulating outer frame comprises polypropylene.

17. The battery as in claim 2, wherein the second chamber contains air.

18. The battery as in claim 6, wherein the metal slurry is based on zinc, lithium, or vanadium.

19. The battery as in claim 8, wherein the pores range from 50 nm to 5 pm in diameter.

* * * * *